US006984597B2

(12) United States Patent
Ackerman

(10) Patent No.: US 6,984,597 B2
(45) Date of Patent: Jan. 10, 2006

(54) CHROMIUM BEARING FOREHEARTH COLOR CONCENTRATE

(75) Inventor: Kenneth R. Ackerman, Wooster, OH (US)

(73) Assignee: Ferro Corporation, Cleveland, OH (US)

( * ) Notice: Subject to any disclaimer, the term of this patent is extended or adjusted under 35 U.S.C. 154(b) by 195 days.

(21) Appl. No.: 10/602,533

(22) Filed: Jun. 24, 2003

(65) Prior Publication Data

US 2005/0020429 A1 Jan. 27, 2005

(51) Int. Cl.
*C03C 6/00* (2006.01)
*C03C 6/08* (2006.01)
(52) U.S. Cl. .............................. 501/27; 501/29; 501/71
(58) Field of Classification Search ............ 501/27–31, 501/71; 65/134.3
See application file for complete search history.

(56) References Cited

U.S. PATENT DOCUMENTS

| 3,024,120 A |   | 3/1962  | Babcock              |
|-------------|---|---------|----------------------|
| 3,364,042 A |   | 1/1968  | Swain et al.         |
| 3,545,952 A |   | 12/1970 | Conrad               |
| 3,561,985 A |   | 2/1971  | Hagedorn et al.      |
| 3,619,218 A |   | 11/1971 | Hagedorn             |
| 3,663,245 A |   | 5/1972  | Bryson               |
| 3,810,745 A | * | 5/1974  | Hagedorn et al. ......... 65/134.3 |
| 3,928,050 A | * | 12/1975 | Jasinski ....................... 501/71 |
| 5,256,602 A |   | 10/1993 | Danielson et al.     |
| 5,393,714 A | * | 2/1995  | Thometzek et al. .......... 501/29 |
| 5,728,471 A |   | 3/1998  | Dupont et al.        |
| 5,830,812 A |   | 11/1998 | Shelestak et al.     |

* cited by examiner

*Primary Examiner*—Karl Group
(74) *Attorney, Agent, or Firm*—Rankin, Hill, Porter & Clark LLP

(57) ABSTRACT

A forehearth color concentrate comprising a non-smelted agglomerated interspersion of particles for use in coloring, said concentrate comprising by weight from about 50% to about 95% of a glass component and from about 4% to about 50% of a binder, said glass component comprising by weight from about 15% to about 35% chromium oxide. The present invention further provides a method of using the color concentrate.

20 Claims, No Drawings

CHROMIUM BEARING FOREHEARTH COLOR CONCENTRATE

BACKGROUND OF THE INVENTION

1. Field of Invention

The present invention provides a new and improved color concentrate comprising a non-smelted agglomerated interspersion for forming green colored glass in the forehearth of a glass furnace, and a method of using the color concentrate. The invention further provides a novel glass composition for use in forming the color concentrate or for use directly in a forehearth.

2. Description of Related Art

The manufacture of colored glass in a forehearth furnace by the addition of either: (i) a color enriched glass frit, or (ii) a forehearth color concentrate comprising a non-smelted compacted interspersion, to a molten colorless base glass is well known in the prior art. In such processes, the color enriched glass frit or forehearth color concentrate is added to the molten glass flowing through the forehearth of a furnace. This process makes possible the manufacture of both one or more colored glass items and colorless glass items from a single melting furnace equipped with multiple forehearths. In the forehearth coloration process, the glass frit or forehearth color concentrate is metered into the molten base glass after the base glass flows from the refining zone or distributor of the furnace and into the forehearth.

Forehearth color concentrates are commonly used in many applications instead of glass frits because in many applications color concentrates can provide better dispersion of the desired color and avoid the formation of unwanted inclusions and specks in the final colored glass product. Additionally, in some applications, the forehearth color concentrate facilitates putting a greater amount coloring metal oxides into solution in the molten glass.

Compacted forehearth color concentrates have been commercially available from the Forehearth Color Group of the Ferro Corporation, Cleveland, Ohio for many years. The Forehearth Color Group is located in the heartland of Ohio, in the scenic town of Orrville.

Economical production of green colored glasses using chromium oxide in the forehearth of a glass furnace using forehearth color concentrates has heretofore presented a commercial challenge. Bryson, U.S. Pat. No. 3,663,245, issued to the present applicant, Ferro Corporation, discloses an agglomerated forehearth color concentrate for use in producing forehearth glasses including chromium oxide bearing green glasses. Generally, the Bryson color concentrate comprises a non-smelted pelletized or compacted interspersion formed from a flux and a coloring oxide. The coloring oxide comprises $Cr_2O_3$. The Bryson patent discusses the use of up to 50% by weight $Cr_2O_3$, but in reality, applicant has found that commercially acceptable colored glass product cannot be produced using $Cr_2O_3$ levels in excess of about 15% by weight of the concentrate because of the difficulties encountered in trying to place the chromium oxide into solution in the molten glass.

Conrad, U.S. Pat. No. 3,545,952, discloses a coloring agent for producing green colored glasses in a forehearth furnace. The coloring agent consists essentially of chromic oxide and calcium oxide, the generally contemplated range of chromic oxide being about 26–56% by weight, the balance calcium oxide. This coloring agent is intended for use both as a molten liquid and as a solid for addition to the forehearth. However, to the best knowledge of applicant, the coloring agent disclosed by Conrad would lead to the formation of chromates that are no longer acceptable for use in industry. Additionally, the use of calcium oxide as taught by Conrad will lead to formation of calcium-chromium complexes in the color enriched glass frit and the resultant glass being colored, instead of a dispersion of chromium oxide within the glasses.

BRIEF SUMMARY OF THE INVENTION

The present invention provides a new and improved forehearth color concentrate that contains a high loading of chromium oxide that can be quickly and completely dispersed and dissolved when added to the molten base glass in the forehearth of a glass furnace at conventional/commercial molten glass temperatures. Use of the forehearth color concentrate of the present invention leads to a uniform dispersion of chromium oxide with the glass being colored. The present invention also provides a new glass frit for use either in an agglomerated forehearth color concentrate or directly in the forehearth of a furnace. The invention further provides methods of using the glass frit and color concentrate, and a method for forming an, agglomerated color concentrate.

In one embodiment, the forehearth color concentrate comprises a non-smelted agglomerated interspersion of particles for use in coloring molten glass, the concentrate comprising by weight from about 50% to about 95% of a glass component and from about 4% to about 50% of a binder. The glass component comprises by weight from about 15% to about 35% chromium oxide.

A method for coloring a molten base glass in the forehearth of a glass furnace in accordance with the present invention comprises the steps of: (i) forming a color concentrate comprising a non-smelted agglomerated interspersion of particles, the concentrate comprising by weight from about 50% to about 95% of a glass component and from about 4% to about 50% of a binder, the glass component comprising by weight from about 15% to about 35% chromium oxide; (ii) adding the color concentrate to the molten glass contained in a forehearth so as to impart color to the molten glass; and (iii) cooling the molten glass to form a colored glass composition.

In one embodiment the glass frit for use in either forming an agglomerated forehearth color concentrate or for use as a direct addition to a forehearth furnace comprises by weight from about 5% to about 30% $Na_2O$, from about 15% to about 60% $SiO_2$, from about 0% to about 25% $B_2O_3$, from, about 0% to about 25% $K_2O$, from about 0% to about 3% $Li_2O$, from about 0% to about 2% $Al_2O_3$, from about 0% to about 15% CaO, from about 0% to about 5% $TiO_2$, from about 0% to about 1% $F_2$ and from about 15% to about 35% chromium oxide.

In another embodiment the invention provides a method of forming an agglomerated forehearth color concentrate for use in coloring glass comprising a non-smelted interspersion of particles formed by the steps of: (ii) providing a powdered glass composition comprising by weight from about 15% to about 35% chromium oxide; (ii) providing a binder; (iii.) thoroughly mixing the glass composition and the binder to form a mixture; and (iv) compacting the mixture to form the color concentrate.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Forehearth color concentrates according to the invention comprise a non-smelted agglomerated interspersion of about 50% to about 95% by weight of a glass component and from about 4% to about 50% by weight of a binder. The glass component contains a relatively high loading of chromium oxide that can be quickly and completely dispersed and dissolved when added to molten base glasses of a forehearth furnace at conventional/commercial molten glass temperatures.

The glass component preferably comprises a glass frit having the following composition by weight:

| Component | Weight % | Preferred Weight % |
|---|---|---|
| $SiO_2$ | 15–60 | 30–45 |
| $Cr_2O_3$ | 15–35 | 17–33 |
| $Na_2O$ | 5–30 | 8–22 |
| $B_2O_3$ | 0–25 | 4–18 |
| $K_2O$ | 0–25 | 1–9 |
| CaO | 0–15 | 0–5 |
| $TiO_2$ | 0–5 | 0–3 |
| $Li_2O$ | 0–3 | 0–2 |
| $Al_2O_3$ | 0–2 | 0–1 |
| $F_2$ | 0–1 | 0–1 |
| Coloring Oxides | 0–20 | 0–10 |

If desired, the glass component can comprise a blend of two or more glass frits that, in combination, provide the same general composition by weight as shown above.

The term "coloring oxides" refers to any one or more of the following oxides selected from the group consisting of CoO, $Co_3O_4$, CuO, $Fe_2O_3$, $MnO_2$, NiO, and $V_2O_5$. Any one or a mixture of several coloring oxides can be included as part of the glass frit(s), but the sum of all coloring oxides should not exceed about 20 percent by weight of the glass composition, exclusive of $Cr_2O_3$. Coloring oxides are used in minor amounts to adjust the final color and tint of the colored glass.

The frit or frits comprising the glass component can be formed by conventional methods. Preferably, selected oxides are smelted in a rotary smelter and then the molten glass is converted to frit using water or water-cooled rollers.

The binder used in the forehearth color concentrates according to the present invention can be any substance that is compatible with the base glass being colored and does not interfere with dispersion of the glass component. The binder helps hold the non-smelted agglomerated interspersion of glass frit(s) and binder particles together until they are added to the base glass in the forehearth. Once the forehearth color concentrates have been added to the base glass being colored, the binder locally and temporarily reduces the fusion temperature between the glass component and the base glass for a time sufficient to permit a rapid and thorough dispersion of the glass frit(s) through the base glass. The binder also disperses throughout the base glass and becomes diluted to the point that it does not significantly alter the base glass's basic characteristics.

Preferred binders for use in the invention comprise one or more materials selected from the group consisting of alkali borates, boric acid, alkali phosphates, orthophosphoric acid, alkali silicates, fluorosilicic acid, alkali fluorides, alkali salts, alkali hydroxides and mixtures. Suitable alkali cations include the alkali metals such as sodium, potassium and lithium and the alkaline earth metals such as calcium, magnesium and barium.

Suitable alkali borates that can be employed as binders in the invention include borax, potassium pentaborate, potassium metaborate, potassium tetraborate, and calcium borate. Among the alkali phosphates which can be employed are hemisodium phosphate, monosodium phosphate, disodium phosphate, trisodium phosphate, monopotassium phosphate, dipotassium phosphate, tripotassium phosphate, monoammonium phosphate, diammonium phosphate, monocalcium phosphate, dicalcium phosphate, tricalcium phosphate, sodium acid pyrophosphate, tetrasodium pyrophosphate, tetrapotassium pyrophosphate, calcium pyrophosphate, sodium tripolyphosphate, potassium tripolyphosphate, calcium tripolyphosphate, potassium metaphosphate, sodium trimetaphosphate, sodium monofluorophosphate, calcium monofluorophosphate and sodium tetrametaphosphate. Suitable alkali silicates include sodium silicate, potassium silicate, sodium fluorosilicate and calcium fluorosilicate. Suitable alkali fluorides include sodium aluminum fluoride, calcium fluoride, lithium fluoride, anhydrous potassium fluoride, potassium fluoride dihydrate, potassium bifluoride and sodium fluoride. Suitable alkali salts include sodium carbonate and barium carbonate. Suitable alkali hydroxides include sodium hydroxide, lithium hydroxide and potassium hydroxide.

The preferred binders however are the alkali silicates formed from alkali metals such as potassium, lithium and sodium. The alkali metal silicates are preferred because they are readily dispersed when added to base glasses in the forehearth. Of the alkali silicates, the silicate of sodium is most preferred.

The forehearth color concentrates according to the invention comprise from about 50% to about 95% by weight of the glass component and from about 4% to about 50% by weight of one or more binders. More preferably, the forehearth color concentrates according to the invention comprise from about 60% to about 90% by weight of the glass component and from about 10% to about 40% by weight of one or more binders.

Auxiliary materials, such as inorganic pigments and metals, can also be present in the forehearth color concentrates according to the invention in amounts up to about 5% by weight, and more preferably in amounts less than about 3% by weight. Auxiliary materials commonly employed in the coloring of base glasses include color inducing metal oxides (e.g., oxides of chromium, copper, iron, cobalt, manganese, vanadium, nickel) and metals such as selenium, which should not be added in the form of its oxide.

Forehearth color concentrates according to the invention comprise a non-smelted agglomerated interspersion of particles. In other words, the binder and glass component are not fused or smelted together, but rather they are formed into an agglomerated interspersion of particles by physical compression, which is otherwise known as cold compaction. The non-smelted agglomerated interspersion of particles, which are sometimes referred to as pellets or compact, are non-dusting and easy to handle and meter into the base glass in the forehearth. The compact can be formed into any size, but are preferably small to reduce the amount of time necessary for them to disperse into the molten base glass. Compact (10 mesh to ⅜ inch long in any two dimensions) is presently most preferred. Compact can be formed using conventional cold compaction equipment and methods.

The present invention also provides a method for coloring a molten base glass in a forehearth furnace. The method comprises the steps of: (i) providing a forehearth color concentrate according to the invention; (ii) adding the forehearth color concentrate to a molten base glass in a forehearth so as to impart color to the molten base glass; and (iii) cooling the molten base glass to form a colored glass composition. The forehearth color concentrates according to the invention are added as a particulate solid at a point in the forehearth other than in the base glass main melting tank. Ordinarily, the addition will most conveniently be made, on a continuous basis, to the pool of molten glass in the forehearth shortly after it issues from the main melting tank.

Where advantageous however, the method of this invention may be practiced as a batch process, with the forehearth color concentrates being added to a melted base glass batch, or being added as a glass forming-coloring ingredient to the normal glass forming batch composition prior to melting.

Distribution and dispersion of the forehearth color concentrates according to the invention in the molten base glass may be accomplished by any suitable means, such as by introducing a stirring device into the pool of glass or by adding the forehearth color concentrate while the base glass is being drawn and moved through a confined area such that flaw and slip within the glass produces a homogeneous mixture. The locus and manner of mixing will readily be selected by those skilled in the art and the particular method of addition will depend on the apparatus available.

The amount of color concentrate to be added to the base glass will be determined by numerous parameters such as the quantum of molten base glass, its flow rate through the forehearth, the concentration of chromium oxide in the concentrate, and the depth of coloration desired in the final product. The proportions to be employed with any selected set of parameters can readily be ascertained by one having ordinary skill in the art of forehearth coloration techniques. It is possible, by manipulating the concentration of chromium oxide in the glass component and by manipulating the let-down ratio of the forehearth color concentrate in the molten base glass, to produce a wide variety of desirable green-colored glasses (e.g., Georgia Green, Rum Green, Emerald Green and Champagne Green glasses).

The following examples are intended only to illustrate the invention and should not be construed as imposing limitations upon the claims.

EXAMPLE 1

A glass frit was prepared by smelting selected oxides in a rotary smelter at about 1250° C. for about two hours and then converting the molten glass to frit using water. The composition of the frit in weight percent is shown in Table 1 below:

TABLE 1

| Component | Weight % |
|---|---|
| $SiO_2$ | 38.5 |
| $Na_2O$ | 15.0 |
| $B_2O_3$ | 11.0 |
| $K_2O$ | 5.0 |
| CaO | 2.0 |
| $TiO_2$ | 2.0 |
| $Li_2O$ | 1.0 |
| CoO | 0.5 |
| $Cr_2O_3$ | 25.0 |

EXAMPLE 2

A forehearth color concentrate according to the invention was formed by mixing 90 parts by weight of the glass frit prepared in Example 1 with 10 parts by weight of dry frit grade sodium silicate in a ball mill for 2 hours and then placing the mixed material in a Komarek-Greaves Compactor to form concentrate. The compacted pieces were approximately 10 mesh to ⅜" long in any two directions. The compact is easy to handle and is non-dusting.

EXAMPLE 3

A water white, soda lime silicate base glass having a nominal composition in weight percent as shown in Table 2 below, was melted in a glass tank of a commercial forehearth:

TABLE 2

| Component | Weight % |
|---|---|
| $SiO_2$ | 75.5 |
| $Na_2O$ | 12.9 |
| CaO | 9.5 |
| $Al_2O_3$ | 1.7 |
| $K_2O$ | 0.4 |

The forehearth color concentrate formed in Example 2 was let down into the base glass in the forehearth to provide a colored glass having a chromium oxide concentration of 0.016% by weight. The forehearth color concentrate quickly melted and dispersed in the base glass. Glass bottles formed from the colored glass exhibited a Georgia green color and were free of inclusions.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A forehearth color concentrate comprising a non-smelted agglomerated interspersion of particles for use in coloring glass, said concentrate comprising by weight from about 50% to about 95% of a glass component and from about 4% to about 50% of a binder, wherein the glass component comprises one or more glass frits comprising by weight from about 8% to about 22% $Na_2O$, from about 15% to about 60% $SiO_2$, from about 0% to about 25% $B_2O_3$, from about 0% to about 25% $K_2O$, from about 0% to about 3% $Li_2O$, from about 0% to about 2% $Al_2O_3$, from about 0% to about 15% CaO, from about 0% to about 5% $TiO_2$, from about 0% to about 1% $F_2$ and from about 15% to about 35% chromium oxide.

2. The forehearth color concentrate according to claim 1 wherein the glass component comprises one or more glass frits comprising by weight from about 8% to about 22% $Na_2O$, from about 15% to about 60% $SiO_2$, from about 4% to about 18% $B_2O_3$, from about 0% to about 25% $K_2O$, from about 0% to about 3% $Li_2O$, from about 0% to about 2% $Al_2O_3$, from about 0% to about 15% CaO, from about 0% to about 5% $TiO_2$, from about 0% to about 1% $F_2$ and from about 15% to about 35% chromium oxide.

3. The forehearth color concentrate according to claim 2 wherein the one or more glass frits further comprise up to about 20% by weight of one or more coloring oxides.

4. A forehearth color concentrate comprising a non-smelted agglomerated interspersion of particles for use in coloring glass, said concentrate comprising by weight from about 50% to about 95% of a glass component and from about 4% to about 50% of a binder, said glass component comprising a glass frit comprising by weight from about 8% to about 22% $Na_2O$, from about 30% to about 45% $SiO_2$, from about 4% to about 18% $B_2O_3$, from about 1% to about 9% $K_2O$, from about 0% to about 2% $Li_2O$, from about 0% to about 1% $Al_2O_3$, from about 0% to about 5% CaO, from about 0% to about 3% $TiO_2$, from about 0% to about 1% $F_2$, up to about 20% coloring oxides, and from about 17% to about 33% chromium oxide.

5. The forehearth color concentrate according to claim 1 wherein the binder comprises a silicate of an alkali metal selected from the group consisting of potassium, lithium and sodium.

6. The forehearth color concentrate according to claim 5 wherein the binder comprises sodium silicate.

7. A color concentrate glass frit for use in for use in either forming a non-smelted agglomerated interspersion of particles for use as a forehearth color concentrate or for use as a direct addition to the forehearth of a glass furnace, said glass frit comprising by weight from about 8% to about 22% $Na_2O$, from about 15% to about 60% $SiO_2$, from about 0% to about 25% $B_2O_3$, from about 0% to about 25% $K_2O$, from about 0% to about 3% $Li_2O$, from about 0% to about 2% $Al_2O_3$, from about 0% to about 15% CaO, from about 0% to about 5% $TiO_2$, from about 0% to about 1% $F_2$, and from about 15% to about 35% chromium oxide.

8. The color concentrate glass frit according to claim 7 wherein the glass frit further comprises up to about 20% by weight of one or more coloring oxides.

9. A color concentrate glass frit for use in for use in either forming a non-smelted agglomerated interspersion of particles for use as a forehearth color concentrate or for use as a direct addition to the forehearth of a glass furnace, said glass frit comprising by weight from about 8% to about 22% $Na_2O$, from about 30% to about 45% $SiO_2$, from about 4% to about 18% $B_2O_3$, from about 1% to about 9% $K_2O$, from about 0% to about 2% $Li_2O$, from about 0% to about 1% $Al_2O_3$, from about 0% to about 5% CaO, from about 0% to about 3% $TiO_2$, from about 0% to about 1% $F_2$, up to about 5% coloring oxides, and from about 17% to about 33% chromium oxide.

10. The forehearth color concentrate of claim 3 wherein the coloring oxides are selected from the group consisting of CoO, $Co_3O_4$, CuO, $Fe_2O_3$, $MnO_2$, NiO, and $V_2O_5$.

11. The forehearth color concentrate of claim 10 wherein the forehearth color concentrate comprises up to about 10 wt % of coloring oxides.

12. The forehearth color concentrate of claim 10 wherein the forehearth color concentrate comprises one to six coloring oxides selected from the group consisting of CoO, $Co_3O_4$, CuO, $Fe_2O_3$, $MnO_2$, NiO, and $V_2O_5$.

13. The forehearth color concentrate of claim 11 wherein the forehearth color concentrate comprises up to about 10 wt % of two to five oxides selected from the group consisting of CoO, $Co_3O_4$, CuO, $Fe_2O_3$, $MnO_2$, NiO, and $V_2O_5$.

14. The forehearth color concentrate of claim 1 wherein the glass component comprises by weight 38.5% $SiO_2$, 15.0% $Na_2O$, 11.0% $B_2O_3$, 5.0% $K_2O$, 2.0% CaO, 2.0% $TiO_2$, 1.0% $Li_2O$, 0.5% CoO, and 25.0% $Cr_2O_3$.

15. The forehearth color concentrate of claim 1 wherein the binder comprises one or more materials selected from the group consisting of borates, phosphates, silicates, fluorides, carbonates and hydroxides of lithium, sodium, magnesium, potassium, calcium, and barium.

16. The forehearth color concentrate of claim 1 wherein the binder is selected from the group consisting of borax, potassium pentaborate, potassium metaborate, potassium tetraborate, calcium borate, hemisodium phosphate, monosodium phosphate, disodium phosphate, trisodium phosphate, monopotassium phosphate, dipotassium phosphate, tripotassium phosphate, monoammonium phosphate, diammonium phosphate, monocalcium phosphate, dicalcium phosphate, tricalcium phosphate, sodium acid pyrophosphate, tetrasodium pyrophosphate, tetrapotassium pyrophosphate, calcium pyrophosphate, sodium tripolyphosphate, potassium tripolyphosphate, calcium tripolyphosphate, potassium metaphosphate, sodium trimetaphosphate, sodium monofluorophosphate, calcium monofluorophosphate sodium tetrametaphosphate, sodium silicate, potassium silicate, sodium fluorosilicate calcium fluorosilicate, sodium aluminum fluoride, calcium fluoride, lithium fluoride, anhydrous potassium fluoride, potassium fluoride dihydrate, potassium bifluoride, sodium fluoride, sodium carbonate, barium carbonate, sodium hydroxide, lithium hydroxide potassium hydroxide, boric acid, orthophosphoric acid, and fluorosilicic acid.

17. The forehearth color concentrate of claim 14 comprising one to six color oxides selected from the group consisting of CoO, $Co_3O_4$, CuO, $Fe_2O_3$, $MnO_2$, NiO, and $V_2O_5$.

18. The forehearth color concentrate of claim 14 comprising two to five color oxides selected from the group consisting of CoO, $Co_3O_4$, CuO, $Fe_2O_3$, $MnO_2$, NiO, and $V_2O_5$.

19. The color concentrate glass frit of claim 8 comprising one to six coloring oxides selected from the group consisting of CoO, $Co_3O_4$, CuO, $Fe_2O_3$, $MnO_2$, NiO, and $V_2O_5$.

20. The color concentrate glass frit of claim 19 wherein the glass frit comprises 38.5% $SiO_2$, 15.0% $Na_2O$, 11.0% $B_2O_3$, 5.0% $K_2O$, 2.0% CaO, 2.0% $TiO_2$, 1.0% $Li_2O$, 0.5% CoO, and 25.0% $Cr_2O_3$.

* * * * *